April 7, 1925.
R. A. KOTTKE
1,532,246
BAKE PAN LIFTER
Filed March 12, 1923
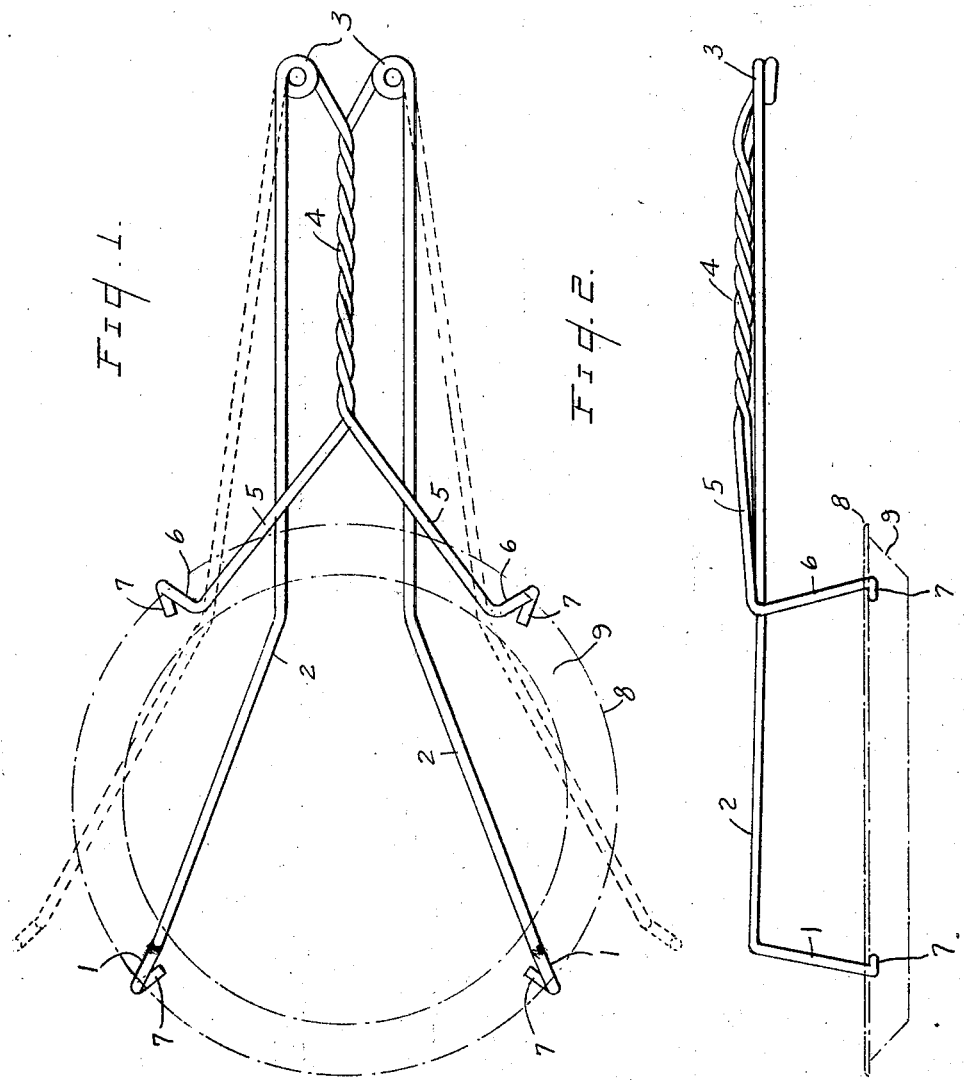
Inventor
Rudolph A Kottke
By
Attorney Patented Apr. 7, 1925.

1,532,246

UNITED STATES PATENT OFFICE.

RUDOLPH A. KOTTKE, OF DETROIT, MICHIGAN.

BAKE-PAN LIFTER.

Application filed March 12, 1923. Serial No. 624,378.

*To all whom it may concern:*

Be it known that I, RUDOLPH A. KOTTKE, a citizen of the United States, residing at Detroit, in the county of Wayne and State of Michigan, have invented a new and useful Bake-Pan Lifter, of which the following is a specification.

This invention relates to kitchen utensils and relates particularly to gripping and lifting tongs for handling hot cooking utensils.

It is the object of the invention to provide a device particularly adapted for gripping and safely handling hot covers, bake pans or other cooking vessels.

In attaining this object the invention contemplates providing a utensil having a pair of flexibly mounted gripping jaws co-acting with one or more rigidly carried jaws, the first-mentioned jaws being normally spaced a distance to clear the marginal flange of a standard sized bake-pan, when the stationary jaws are engaged with said flange and being actuable toward each other and into co-acting relation with said rigid jaws through a pressure applied by the hand supporting the device.

A preferred embodiment of the invention is hereinafter described and illustrated in the accompanying drawing, wherein, Fig. 1 is a plan view showing in dasn lines the normal position of the flexibly carried jaws and in full lines showing said jaws clamped upon a pan.

Fig. 2 is a side view of the same.

In these views the reference character 1 designates a pair of jaws terminally formed upon a pair of long flexible wire arms 2 which diverge toward their jaw-carrying ends. At the other ends of said arms, the wires forming the same are respectively coiled to form springs 3 spaced slightly and urging said arms to their maximum divergent relation, as Fig. 1 illustrates in dash lines. Said wires are then twisted one about the other, as indicated at 4, while being extended lengthwise of the arms 2, between the same. Finally said wires are diverged at an acute angle so as to cross the arms 2 approximately midway of the length of the latter, forming relatively short and substantially rigid arms 5 bent terminally, similarly to the arms 2, to form a pair of jaws 6. While the spaced relation of the jaws 6 is substantially a constant, owing to the short length and rigid connection of the arms 5 the jaws 1 are movable to and from each other through a considerable distance, as provided for by the long flexible arms 2 and the spring supports thereof 3. Each of the jaws 1 and 6 is terminally bent at a right angle in a common plane toward a point substantially equidistant from all of said ends, seats 7 thus being formed for engagement beneath the flange 8 of a pan 9.

In the use of the described utensil, the relatively close adjacent portions of the arms 2, extending rearwardly from the arms 5 are employed as a handle. This handle portion is gripped freely enough to allow the arms 2 to maintain their maximum divergence, while said arms are advanced above the pan to be lifted, the jaws 6 being at the same time advanced to engage their seats 7 beneath the flange of the pan. The device is then tilted to engage the jaws 1 at each side of the pan, and thereupon pressure is applied to the handle portions of the arms 2 to engage the seats 7 of the jaws 1 beneath the flange 8. By maintaining the arms 2 pressed toward each other, the operator may now lift the engaged pan by means of the described device and carry said pan where desired without discomfort due to a heated condition of the pan and its contents.

The wire formation of the described utensil is conducive to quantity production thereof at low cost. It is to be noted that the arms 2 pass beneath the arms 5 so as to support the latter when the device is in use. This is of importance since the element 4 carrying said arms will receive little, if any, direct support from the hand gripping the device. It is also a feature of the construction that the jaws 6 function as stops limiting the divergence of the arms 2 established by the springs 3.

What I claim is:

In a device of the character described, two pairs of wire arms, each pair carrying coacting jaws for gripping utensils, one of said pairs of arms being connected in a substantially rigid relation and the arms of the other pair being flexibly connected to said rigid arms for movement to and from each other, each rigid arm being integral with one flexible arm, and the lengths of wire forming said arms being twisted one around the other between the joined ends of said arms.

In testimony whereof I sign this specification.

RUDOLPH A. KOTTKE.